(12) United States Patent
Kirk et al.

(10) Patent No.: US 9,908,431 B2
(45) Date of Patent: Mar. 6, 2018

(54) BATTERY COUNTERWEIGHT SYSTEM

(71) Applicant: THE RAYMOND CORPORATION, Greene, NY (US)

(72) Inventors: John Bryant Kirk, Greene, NY (US); Adam Wayne Standard, Johnson City, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 15/457,034

(22) Filed: Mar. 13, 2017

(65) Prior Publication Data

US 2017/0259693 A1    Sep. 14, 2017

Related U.S. Application Data

(60) Provisional application No. 62/307,626, filed on Mar. 14, 2016.

(51) Int. Cl.
| | |
|---|---|
| *B60L 11/18* | (2006.01) |
| *H01M 10/613* | (2014.01) |
| *H01M 10/625* | (2014.01) |
| *H01M 10/6556* | (2014.01) |
| *B60K 1/04* | (2006.01) |
| *H01M 2/10* | (2006.01) |
| *H01M 2/14* | (2006.01) |

(52) U.S. Cl.
CPC ............ *B60L 11/1879* (2013.01); *B60K 1/04* (2013.01); *H01M 2/1072* (2013.01); *H01M 2/14* (2013.01); *H01M 10/613* (2015.04); *H01M 10/625* (2015.04); *H01M 10/6556* (2015.04); *B60L 2200/40* (2013.01); *H01M 2220/20* (2013.01)

(58) Field of Classification Search
CPC ............ B60L 11/1879; B60L 2200/40; H01M 10/613; H01M 10/625; H01M 10/6556; H01M 2/10; H01M 2/14
See application file for complete search history.

(56) References Cited

U.S. PATENT DOCUMENTS

| | | | |
|---|---|---|---|
| 6,973,986 B2 | 12/2005 | Murase | |
| 7,323,272 B2 * | 1/2008 | Ambrosio | ........... H01M 2/1077 429/100 |
| 7,427,156 B2 | 9/2008 | Ambrosio et al. | |
| 7,510,797 B2 | 3/2009 | Aker et al. | |
| 8,115,450 B2 | 2/2012 | Ambrosio et al. | |

(Continued)

FOREIGN PATENT DOCUMENTS

| | | |
|---|---|---|
| EP | 0575060 B1 | 9/1996 |
| EP | 2156485 B1 | 3/2012 |
| WO | 2012145795 A1 | 11/2012 |

*Primary Examiner* — Erez Gurari
(74) *Attorney, Agent, or Firm* — Quarles & Brady LLP (57) ABSTRACT

A counterweight system for a battery of a material handling vehicle is provided. A counterweight case can be configured to receive the battery. One or more spacers can be disposed within the counterweight case. The one or more spacers can space the battery apart from one or more internal walls of the counterweight case, when the battery is received in the counterweight case. In some cases, the spacers, along with vent holes, plugs, brackets, and/or a cover (e.g., a blanket cover) can help to protect the battery from environmental factors (e.g., heat, cold, vibrations, contact, and so on).

20 Claims, 7 Drawing Sheets

(56) References Cited

U.S. PATENT DOCUMENTS

| | | | |
|---|---|---|---|
| 8,252,455 B2* | 8/2012 | Kusama | H01M 2/1055 429/149 |
| 8,816,645 B2* | 8/2014 | Dickinson | H01M 2/1077 320/150 |
| 9,214,654 B2 | 12/2015 | Nagatani et al. | |
| 9,368,785 B2 | 6/2016 | Hirakawa et al. | |
| 9,381,798 B2 | 7/2016 | Meyer-Ebeling | |
| 2006/0162973 A1 | 7/2006 | Harris et al. | |
| 2009/0283346 A1* | 11/2009 | Katae | B60K 1/04 180/68.2 |
| 2010/0122860 A1* | 5/2010 | McKelvey | B60K 1/00 180/65.1 |
| 2011/0189537 A1* | 8/2011 | Wang | H01M 2/10 429/186 |
| 2013/0288096 A1* | 10/2013 | Frutschy | H01M 2/1088 429/99 |
| 2015/0064542 A1* | 3/2015 | Noh | H01M 2/1016 429/156 |
| 2015/0093982 A1* | 4/2015 | Bailey | H01M 2/1077 454/184 |
| 2015/0099154 A1* | 4/2015 | Okuda | H01M 2/18 429/142 |
| 2015/0217659 A1 | 8/2015 | Seimiya | |
| 2015/0239719 A1* | 8/2015 | Oishi | H01M 2/1083 180/68.5 |
| 2015/0303423 A1* | 10/2015 | Okuyama | B60K 1/04 187/233 |
| 2015/0318523 A1* | 11/2015 | Maeda | B60L 11/1803 320/128 |
| 2015/0318585 A1* | 11/2015 | Morisaku | H01M 10/625 429/120 |
| 2015/0357616 A1* | 12/2015 | Morisaku | H01M 2/1077 429/99 |
| 2016/0049702 A1* | 2/2016 | Oishi | H01M 10/625 429/62 |
| 2016/0052440 A1* | 2/2016 | Young | B60P 1/34 298/1 C |
| 2017/0182924 A1* | 6/2017 | Lendo | B60K 1/02 |

* cited by examiner

BATTERY COUNTERWEIGHT SYSTEM

CROSS-REFERENCE TO RELATED APPLICATION

This application claims priority to U.S. Provisional Patent Application 62/307,626, titled "Battery Counterweight System" and filed Mar. 14, 2016, the entire contents of which are incorporated herein by reference.

BACKGROUND

In conventional systems for material handling vehicles such as forklifts, lead acid batteries have been used as an energy source. These batteries tend to be very heavy, such that it was generally not necessary to add weight to the relevant systems in order for the vehicles to be properly balanced for different operations. However, lead acid batteries also tend to have significantly lower energy and power density than more advanced batteries, such as lithium-based batteries. Accordingly, providing a lead-acid battery with sufficient storage capacity for a particular vehicle or vehicle operation can require a substantial amount of space, and thereby preclude inclusion of certain other features.

Also in conventional systems, protection for batteries against contact, vibration, and other similar effects, can be limited. Further, relatively few features, if any, are typically included to help control battery temperature (e.g., in very hot or very cold environments). Although some batteries can operate at temperature extremes, other batteries can suffer from significant performance loss. Performance of some types of batteries, for example, can be significantly limited by temperature. For example, cold temperatures can reduce the available power from these batteries, and charging the batteries at low temperatures can damage the battery cells. Further, use at high temperatures can raise the temperature of the battery cells, and thereby limit the utility of opportunity charging, which can otherwise represent a significant advantage, particularly in material-handling operations.

Further, conventional systems can offer relatively little protection for battery electrical components from water and other the environmental factors. As such, batteries in conventional systems can be exposed to environmental water and other factors.

SUMMARY

Some embodiments of the invention provide a counterweight system for a battery of a material handling vehicle. A counterweight case can be configured to receive the battery, and one or more spacers can be disposed within the counterweight case. The spacers can space the battery apart from one or more internal walls of the counterweight case, when the battery is received in the counterweight case.

Other embodiments of the disclosure also provide a counterweight system for a battery of a material handling vehicle. A counterweight case can include a base support and a plurality of side walls, with the base support and side walls at least partly defining a cavity for receiving the battery. A plurality of spacer pads can be disposed along the side walls within the cavity, with the spacer pads spacing the battery apart from the side walls and defining one or more gaps between the spacer pads. The gaps can allow fluid to flow along the one or more gaps to cause convective heat transfer between the fluid and the battery. A plurality of additional spacer pads can be supported above the base support within the cavity, with the additional spacer pads supporting the battery above, and spacing the battery apart from, the base support. The additional spacer pads can define one or more gaps between the additional spacer pads, with the gaps allowing fluid to flow along the one or more second gaps. A plurality of vent holes can extend through the side walls, with the vent holes allowing fluid to pass into and out of the counterweight case.

Some embodiments of the invention provide a counterweight system for a battery of a material handling vehicle, including a counterweight case configured to receive the battery and a plurality of spacers disposed within the counterweight case. The spacers can space the battery apart from one or more internal walls of the counterweight case, when the battery is received in the counterweight case, and can be configured to be customizably arranged into different configurations within the counterweight case.

Some embodiments of the invention provide a customizable battery system for a material handling vehicle. A counterweight case can include a base support and a plurality of side walls, with the base support and side walls at least partly defining a cavity for receiving a battery. A plurality of first spacer pads can be disposed within the cavity, at least partly along the plurality of side walls, to space the battery apart from one or more of the side walls, with one or more first gaps between the first spacer pads allowing fluid to flow along the side walls for convective heat transfer with the sides of the battery. A plurality of second spacer pads can be disposed within the cavity, at least partly above the base support, to space the battery apart from the base support, with one or more second gaps between the second spacer pads allowing fluid to flow along the one or more second gaps for convective heat transfer with the bottom of the battery. A plurality of height adjustment members, each can be configured to be supported by at least one of: the base support of the counterweight case, another height adjustment member, and at least one of the second spacer pads.

The first spacer pads and the second spacer pads can be configured to be customizably arranged into different configurations within the counterweight case, to one or more of: support the battery in a customizable orientation and provide customizable heat transfer effects for the one or more first gaps and the one or more second gaps. The height adjustment members can be configured to be customizably included or excluded from the counterweight case to one or more of: support the battery in the customizable orientation and provide the customizable battery system with a customizable weight.

Some embodiments of the invention provide method of customizing a battery system for a material handling vehicle, with the battery system including a counterweight case that includes a base support and side walls for receiving a battery, first spacer pads, second spacer pads disposed within the counterweight case at least partly above the base support, and a plurality of height adjustment members. A number of the height adjustment members can be selected for installation within the counterweight case, to provide a support surface for the battery at a select height within the counterweight case. A number of the first spacer pads can be selected for installation along the side walls of the counterweight case, to space the battery at a select spacing from the side walls, with a first select configuration of fluid-flow gaps between the first spacer pads. A number of the second spacer pads can be selected for installation above the base support and the selected height adjustment members, to space the battery at a select distance above the support surface, with a second select configuration of fluid-flow gaps between the second spacer pads. The selected height adjustment members, the selected first spacer pads, and the selected second spacer pads can be installed within the counterweight case. The battery can be installed within the counterweight case to be supported by the selected height adjustment members, the selected first spacer pads, and the selected second spacer pads.

BRIEF DESCRIPTION OF THE DRAWINGS

The accompanying drawings, which are incorporated in and form a part of this specification, illustrate embodiments of the invention and, together with the description, serve to explain the principles of embodiments of the disclosure.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Likewise, "at least one of A, B, and C," and the like, is meant to indicate A, or B, or C, or any combination of A, B, and/or C, including single or multiple instances of A, B, and/or C. Unless specified or limited otherwise, the terms "mounted," "secured," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise defined or limited, the term "battery" can be viewed as including the relevant battery cells, as well as other components included in the same generally structure as the battery cells. With regard to lithium ion ("LI") batteries, for example, the term "battery" can encompass the battery cells and a battery case containing the battery cells, as well as various bus bars, switches, other electronics and other components of an associated battery management system.

Generally, the counterweight system ("CWS") disclosed herein can support the use of LI and other batteries in material handling vehicles, including the use of different batteries having different sizes and weights. In some embodiments, the disclosed CWS can protect the batteries from contact, can allow for adjustments in weight and height, can provide vibration reduction, and can provide thermal insulation as well as improved heat transfer (e.g., for cold and hot environments, respectively). These benefits, collectively and individually, can be useful, for example, in the industrial environments typical to many operations involving material handling vehicles.

In some embodiments, the disclosed CWS can include a counterweight case that serves to both receive and contain an LI (or other) battery and to provide appropriate counterweight to correct for the (potentially) relatively low weight of such batteries. In this regard, the disclosed CWS can serve as a mechanical interface between a battery and the material handling vehicle, shielding the battery, while also providing for sufficient weight to support safe and balanced operation of the relevant vehicle. Further, some embodiments can include features to mitigate the effects on the battery of relatively high or low temperatures in the operating environment of the vehicle.

Figure 1:
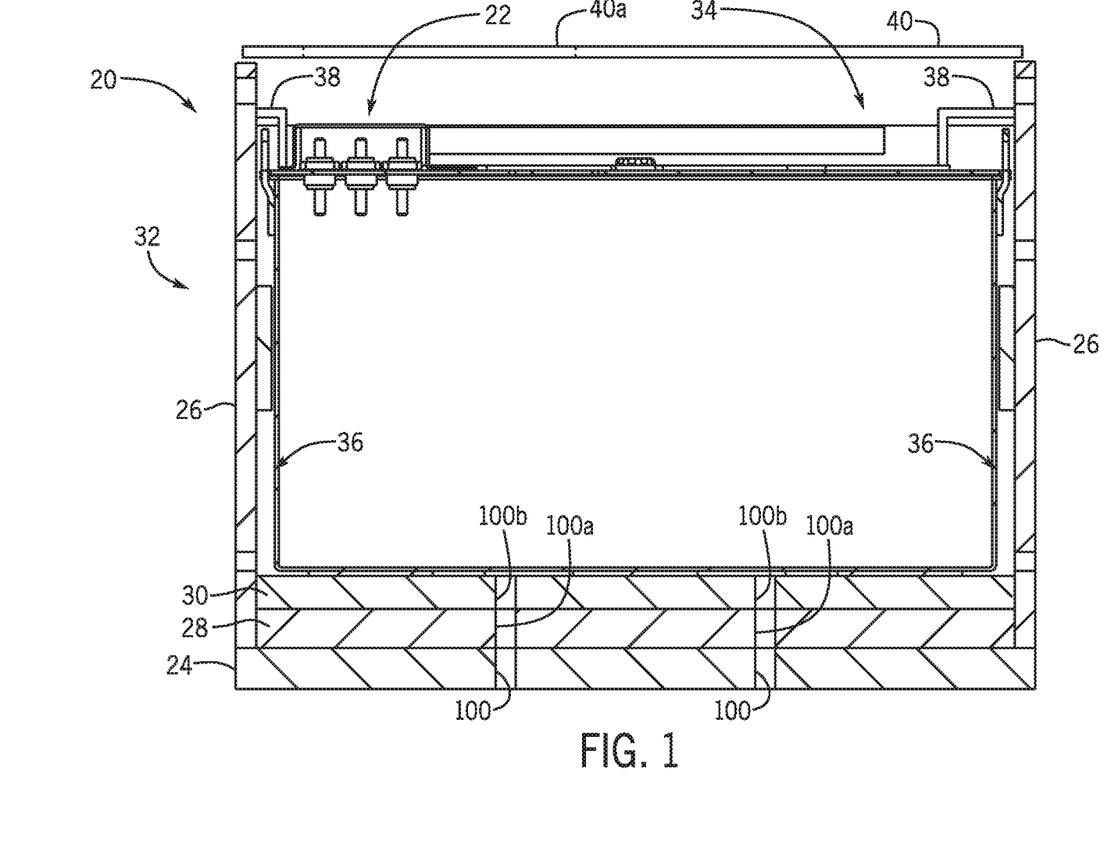
FIG. 1 is a cross-sectional view of a battery counterweight system according to one embodiment of the disclosure, taken from a first side of the system, with the battery counterweight system holding a battery.
Figure 2:
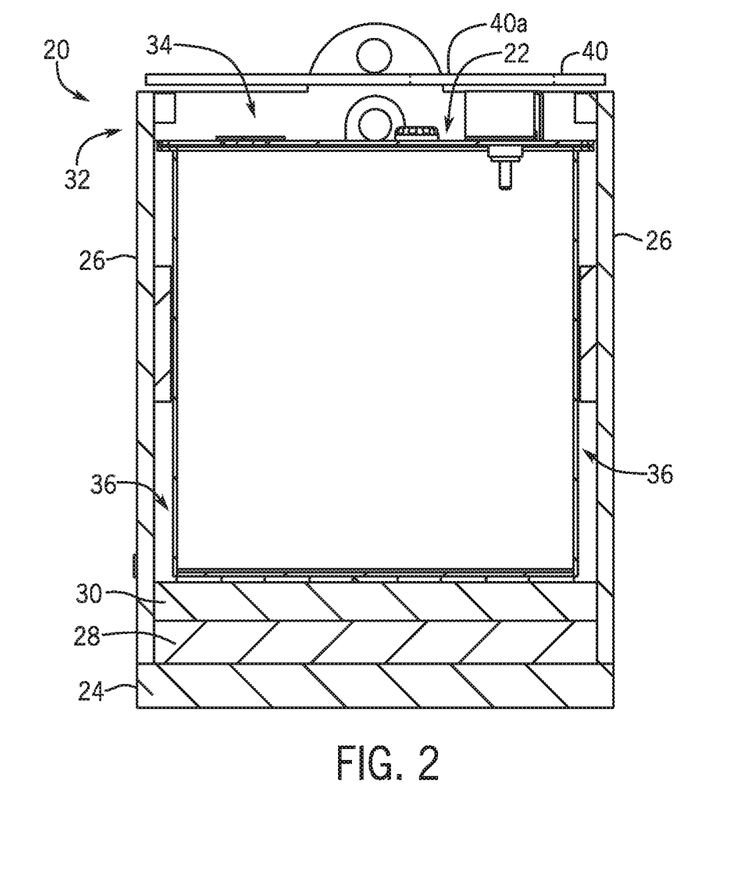
FIG. 2 is a cross-sectional view of the battery counterweight system of FIG. 1, taken from a second side of the system.

FIGS. 1 and 2 illustrate one embodiment of the disclosed CWS, designated as an example CWS 20 configured to receive a battery 22. The CWS 20 includes a base support configured as a generally solid support plate 24, as well a number of side walls configured as generally solid side plates 26. In order to provide appropriate support for the battery 22, and also add appropriate weight to the CWS, the support plate 24 can be formed as a relatively thick steel plate, although other constructions are also possible. For example, in some embodiments, a base plate and multiple wall plates can be integrally cast or otherwise integrally formed.

The side plates 26 and the support plate 24 can collectively define a counterweight case 32, with an internal cavity 34, within which the battery 22 can be received. It will be understood that a battery can be viewed as "received" within a particular cavity even if the battery is not fully encompassed by the cavity. For example, in some embodiments a portion of the battery 22 can extend outside of the cavity 34 even when the battery 22 is received in the cavity 34. Further, it will be understood that, for some systems, certain electronic components of a battery (e.g., wires (not shown) for connecting the battery 22 to vehicle systems) may be required to extend outside the relevant cavity, even when a body of the battery is received within the cavity.

As also discussed below, the case of a CWS can be dimensioned such that a gap (or gaps) of appropriate width can be provided between a battery received within a cavity of the case and the various internal walls of the case. For example, in the CWS 20, the case 32 and the cavity 34 are dimensioned such that various gaps 36 are provided between the battery 22 and the side plates 26 when the battery 22 is received within the cavity 34. Although not illustrated in FIGS. 1 and 2, gaps can also be provided between a battery and the bottom, inner walls of a counterweight case.

Gaps between the walls of a case and a battery can be useful for a variety of reasons. For example, a gap between a wall and a battery can serve to improve thermal insulation for the battery, or to allow for convective heat transfer with the battery. Similarly, spacing between the battery and the case can diminish effects on the battery of contacts with the case. As also discussed below, in some embodiments, customizable (or other) pads can be arranged along different gaps, including in order to control heat transfer characteristics of a CWS (e.g., by defining and maintaining appropriate insulation or flow gaps) and to further cushion the battery relative to the case (e.g., to protect against contacts with the case).

In some embodiments, a counterweight case can be configured to customizably receive height-adjustment members. Generally, height-adjustment members can be added (or removed) from a counterweight case to adjust for different battery sizes, heights, and other characteristics. For example, steel (or other) support plates can be added (or removed) from a steel-bottomed (or other) counterweight case in order to support smaller (or larger) batteries at appropriate heights within the counterweight case. In this way, through the selection of an appropriate number and size of height-adjustment plates, a particular counterweight case can be configured to receive a variety of different battery sizes for operation. Alternatively (or complimentarily), support plates can be added (or removed) from a case in order to adjust the weight of the case, for proper counterbalancing of a relevant vehicle. In this way, through the selection of an appropriate number and size of height-adjustment plates, a particular counterweight case can be configured to receive a variety of different battery weights for operation.

In the embodiment illustrated, the CWS 20 is configured to receive height-adjustment members further configured as height-adjustment plates. Depending on the desired support height for a battery, or on a desired weight, one or more of these plates can be added to (or taken out of) the counterweight case 32. As illustrated in FIGS. 1 and 2, the counterweight case 32 includes two height-adjustment plates 28 and 30, in order to support the battery 22 at an appropriate height within the cavity 34. As needed for other batteries or operating conditions, a different arrangement of the plates 28 and 30 (e.g., only the plate 28) or other plates can be used.

Consistent with the discussion above, the height-adjustment plates 28 and 30 also usefully ensure that the counterweight case 32 has an appropriately large total weight. In cases where a different weight is needed (e.g., for operations with lighter batteries), a different arrangement can be used. For example, the counterweight case 32 can accommodate arrangements with more or fewer of the plates 28 and 30, arrangements with plates of different (e.g., less or more dense) material, or arrangements of other height-adjustment members with different geometries.

In some embodiments, the plates 28 and 30 can be stacked inside of the cavity that is generally defined by the support plate 24 and the side plates 26. In other embodiments, other configurations are possible. For example, some height-adjustment members can be configured to slide laterally into place within a case. In some embodiments, a case can be configured with rigid supports or equipped with different types of pads, so that height-adjustment members do not support each other directly.

The counterweight case 32 can be constructed in a number of ways, including through permanent or temporary attachment of various combinations of the support plate 24, the side plates 26, the height-adjustment plates 28 and 30, and other components. For example, in some embodiments, the support plate 24 and side plate 26 can be welded, cast or riveted together to form a relatively permanent attachment, while the height-adjustment plates 28 and 30 (or others) can be secured in place using adhesives, attachment brackets or tabs, or other relatively temporary means such as screws or bolts. Use of temporary attachment means for height-adjustment members can be useful, for example, in order to allow for customization of the height of the cavity 34 and the total weight of the CWS 20, in order to accommodate different batteries (and other components) of different weights and sizes.

Also as illustrated, the CWS 20 includes a number of brackets 38 (not shown in FIG. 2) for securing the battery 22 within the cavity 34. In some embodiments, the brackets 38 can be configured to accommodate batteries of different sizes. For example, the brackets 38 can be configured for elastic deformation, for manual adjustment, to receive their own spacers (not shown), or otherwise, such that the brackets 38 can secure batteries of a variety of dimensions within the cavity 34. In some embodiments, the brackets 38 can secure the battery 22 against movement in multiple directions. For example, the brackets 38 can be configured to prevent the battery 22 from moving upward out of the cavity 34 as well as from moving side to side within the cavity 34.

In some embodiments a removable cover, such as a blanket 40, can be used to cover the top (or other portions) of the cavity 34, or other portions of the CW system 20. As also discussed below, a cover such as the blanket 40 can be useful for improving insulation characteristics of the CW system 20, as well as for various other benefits.

A cover such as the blanket 40 can be secured in place in various ways, including via fasteners such as snaps or clips, via magnets (e.g., magnets embedded within the blanket 40), or otherwise. Various holes, ports, or sleeves (not shown) can be provided in the blanket 40 (or other cover) in order to allow conduits for the battery 22 (e.g., electrical wires) and other components to pass into and out of the cavity 34. In some embodiments, a box or other container (not shown) can be secured to the case 32, for storage of the blanket 40 (or other cover) when the blanket 40 (or other cover) is not in use.

In some embodiments, a cover can be formed from clear or translucent material, or can include a clear or translucent feature or area, which may usefully permit observation of indicator lights or labels on top of the battery, or of other components within the cavity 34. For example, in the embodiment illustrated, the blanket 40 includes a clear plastic window 40a, which can allow an operator to visually inspect aspects of the battery 22.

Figure 3:
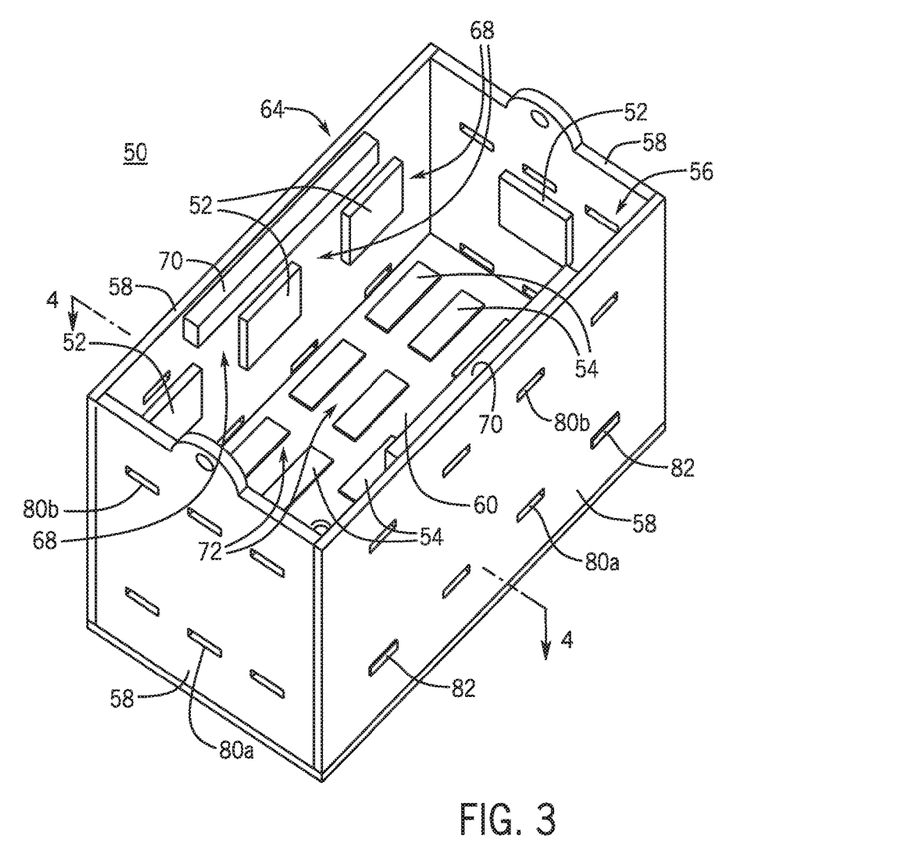
FIG. 3 is a top perspective view of a battery counterweight system according to another embodiment of the disclosure, with a battery not included.
Figure 4:
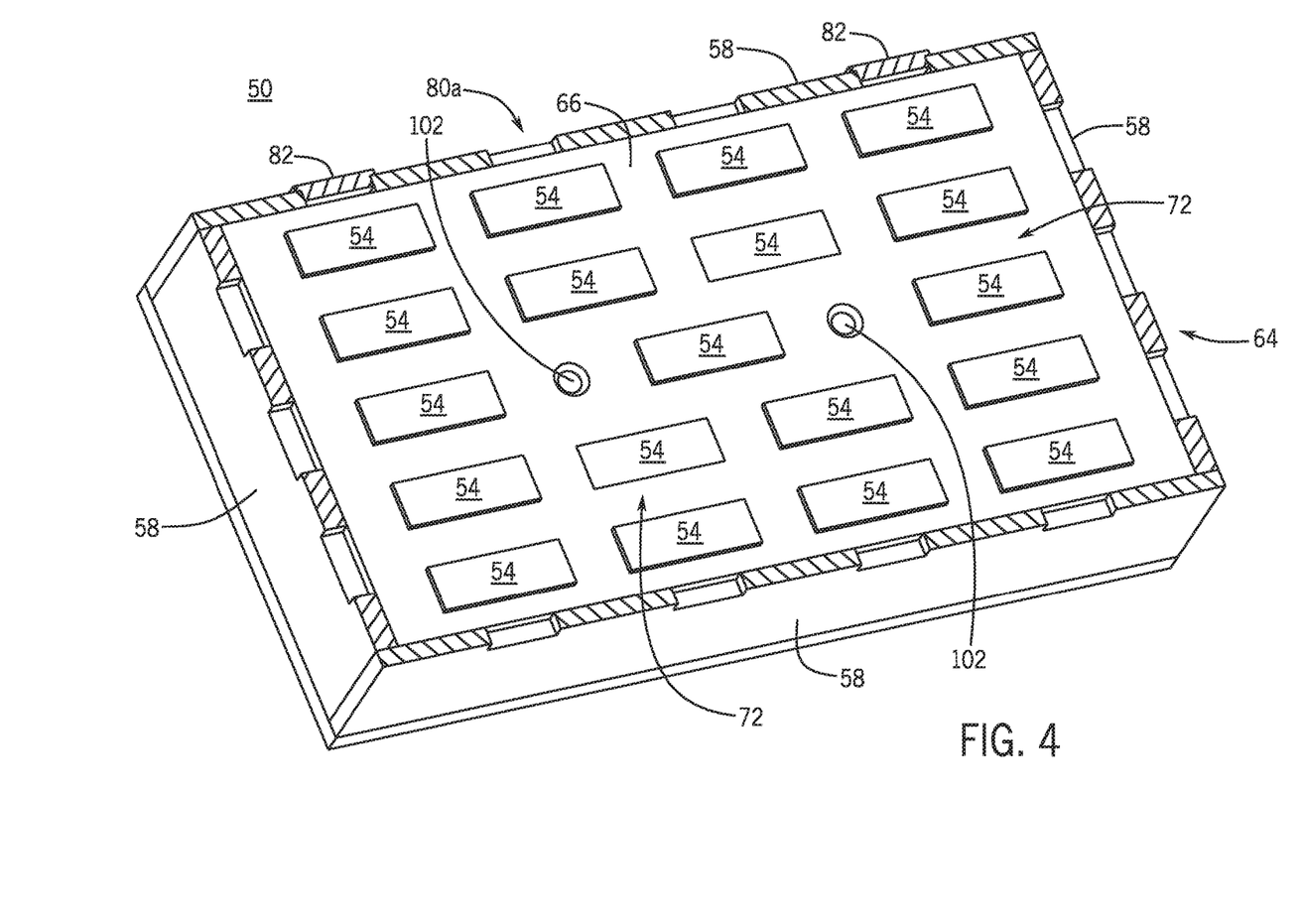
FIG. 4 is a top cross-sectional view of a bottom portion of the battery counterweight system of FIG. 3, taken along section 4-4 of FIG. 3.

In some embodiments, a CWS can include spacers, such as rubber pads or pads of other material (e.g., silicone). FIGS. 3 and 4, for example, illustrate a CWS 50, similar to the CWS 20, but with a plurality of side spacer pads 52 and bottom spacer pads 54 disposed within a cavity 56 of the CWS 50.

The spacer pads 52 and 54 are generally configured to support and space a battery (not shown in FIG. 3) away from the internal surfaces of side walls 58 and bottom wall 60 of the cavity 56. Further, the pads 52 and 54 can be configured in any number of different arrangements, within or without the relevant case. This can allow customers (or manufacturers) to easily accommodate different battery sizes or other needs (e.g., for support or heat transfer) with a single CWS. In this further regard, accordingly, embodiments of the disclosed CWS can be highly customizable.

The pads 52 and 54 can be attached to the walls 58 and 60 in a variety of ways. In some embodiments, the pads 52 and 54 can be removably secured within the cavity 56 (e.g., via removable adhesive or fasteners, such as screws) so that the pads 52 and 54 can be swapped for other pads with other characteristics (e.g., pads with different dimensions, pads of different material, and so on), rearranged into other configurations, or otherwise reconfigured. When height-adjustment members are used, as in the CWS 20 (see FIGS. 1 and 2), it can be useful to arrange for the bottom spacer pads 54 to be attached to the uppermost of the height-adjustment members, such that the pads 54 are disposed appropriately to support a battery received within the cavity 56.

In some embodiments, the pads 52 and 54 (or others) can be configured for attachment to a battery (not shown in FIG. 3), rather than (or in addition to) attachment to the side and bottom walls 58 and 60, such that the pads 52 and 54 can be received by and removed from the cavity 56 along with the battery. This may be useful, for example, in order to configure batteries of different sizes for rapid installation in the CWS 50 without the (potential) need to rearrange or otherwise reconfigure spacers (e.g., spacer pads) within the cavity 56.

The pads 52 and 54 (and others) can be formed from a variety of different materials and with a variety of different dimensions, including different lengths and widths, and different thicknesses (e.g., as measured perpendicularly to the side and bottom walls 58 and 60, respectively). Use of different materials can be useful, for example, in order to ensure appropriate support and cushioning for batteries of different sizes and weights, or to provide for satisfactory performance (e.g., insulating performance) and lifespan in different environmental conditions (e.g., cold conditions, hot conditions, wet conditions, or others). Use of different thicknesses can be useful, for example, in order to accommodate batteries of different sizes or weights. For example, for a given size of the cavity 56, relatively thick pads 52 and 54 can sometimes be used for relatively small batteries, while relatively thin pads 52 and 54 can sometimes be used for relatively large batteries. Similarly, in some configurations, thicker pads can be used for heavier batteries, in order to provide appropriate cushioning for the batteries during operation.

In some embodiments, pads (or other spacers) can exhibit different overall geometries than the pads 52 and 54. For example, in different embodiments, pads can be configured as circles or oval shapes, as lattices, strips, annular shapes, and so on. This can be useful, for example, in order to provide appropriately distributed cushioning and other support for batteries, to accommodate different battery features and profiles, to enhance heat transfer characteristics, and so on.

In some embodiments, pads (or other spacers) for a CWS can be arranged to provide enhanced heat transfer characteristics for the CWS. Referring again to FIG. 3, for example, selection of particular dimensions and spacings for the pads 52 and 54 can help to provide appropriate heat transfer for a battery received within the cavity 56. In the arrangement illustrated, the pads 52 are separated from each other to define gaps 68 therebetween. Because the pads 52 serve to space a battery within the cavity 56 from the side walls 58, the gaps can provide relatively open space between the battery and the side walls 58 through which air (or other fluid) can flow. This air (or other fluid) flow can cause heat to be transferred away from (or to) the battery via natural or forced convection, such that the battery can be maintained at an appropriate operating temperature even where the environment may exhibit relatively extreme temperatures (e.g., relatively high temperatures). Similar gaps 72 (not all numbered for clarity of presentation) are also defined between the bottom spacer pads 54, such that the bottom of a battery within the cavity 56 can also be exposed to fluid flow and convective heat transfer. As also discussed below, the bottom gaps 72 can also help to allow fluid to drain away from a battery received within the cavity 56.

In some embodiments, the various spacer pads 52 and 54 (and others) can be useful with regard to heat transfer even aside from their role in defining the gaps 68 and 72. For colder environments, for example, the pads 52 and 54 can themselves insulate a battery received within the cavity 56 from the relatively high-conductivity metal that can be used for the side and bottom walls 58 and 60 of a case 64 of the CWS 50.

In other embodiments, other configurations are possible. In some embodiments, different configurations of air-flow or other gaps between pads can be defined, both within and without a relevant case. For example, pads (or other spacers) can be arranged in different patterns than those in the arrangement illustrated in FIGS. 3 and 4 in order to define heat-transfer channels with different flow patterns or capacities. Further, in some embodiments, pads (or other spacers) of different overall geometries (e.g., as discussed above) can also be used to define customized flow paths or other heat transfer features.

Figure 5:
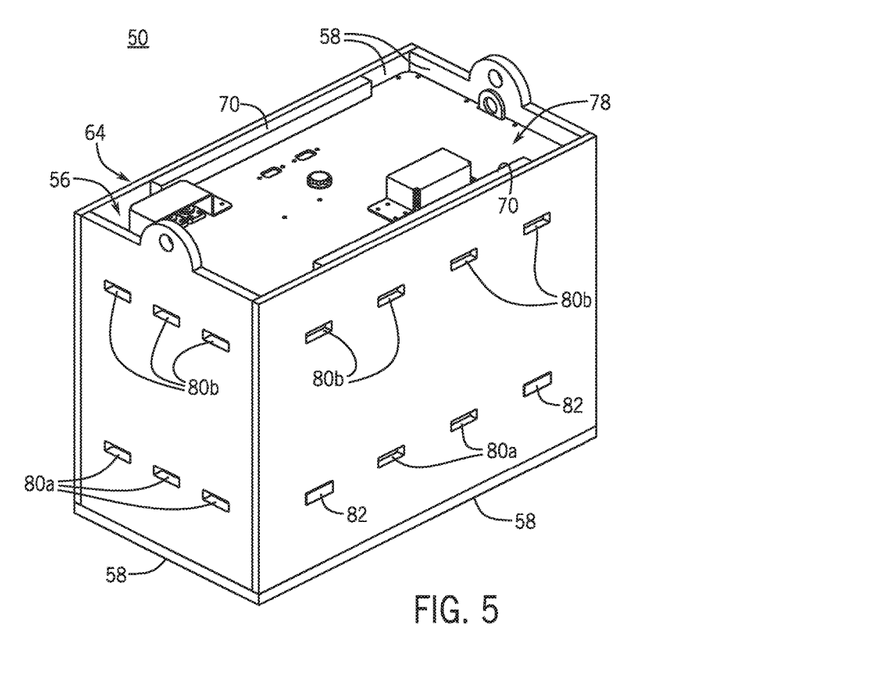
FIG. 5 is a top perspective view of the battery counterweight system of FIG. 3 showing an example air flow through the battery counterweight system, with the battery installed in the battery counterweight system and with a plurality of ventilation plugs inserted.
Figure 6:
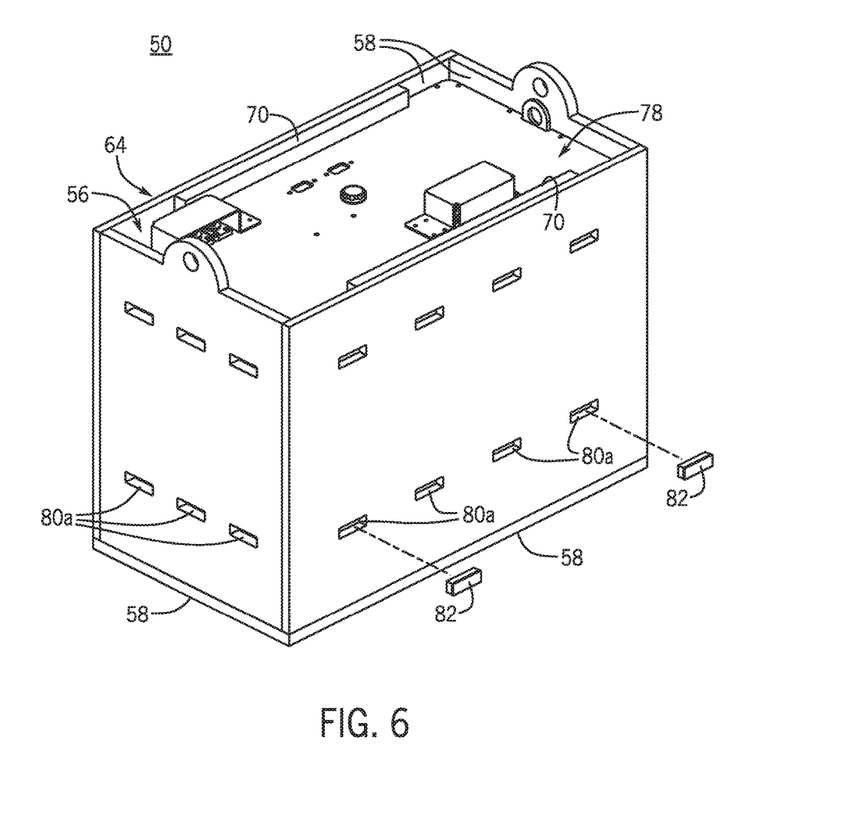
FIG. 6 is a perspective view of the battery counterweight system of FIG. 3, with the battery installed and with the plurality of ventilation plugs removed.

FIG. 3 and FIG. 5 further illustrate example brackets 70 for securing a battery within a CWS. The brackets 70 are configured as extended, generally solid bodies that can be secured to the side walls 58 of the case 64 using fasteners (as illustrated) or various other means (e.g., adhesives). For a battery to be received within the case 64, the brackets 70 can be removed from the walls 58, the battery can be positioned within the cavity 45 of the case 64 (see, e.g., a battery 78 received within the cavity 56 in FIG. 5), and the brackets 70 then reattached to the walls 58.

Usefully, different embodiments of the brackets 70 can be configured with a variety of thicknesses, stiffnesses, contours, materials, and so on, so as to accommodate various different types and configurations of batteries and CWS cases. In some embodiments, the brackets 70 can be further configured to support or secure a cover the CWS 50, such as the blanket 40 of FIGS. 1 and 2. In some embodiments, it may be possible to insert a battery into the cavity 56 without removing the brackets 70. For example, the brackets 70 may elastically deform in order to permit installation of the battery, then spring back to a shape suitable for holding the battery within the cavity 56.

In some embodiments, various vent holes 80 (indicated variously as 80*a* and 80*b*, and not all numbered, for clarify of presentation) can be provided (e.g., in the side walls 58). In some embodiments, the vent holes 80 can also support useful heat transfer for the battery (and the CWS 50 generally). For example, referring also to FIG. 5, a battery 78 received within the cavity 56 can be cooled by natural convection via the vent holes 80. As illustrated, for example, relatively cool air can enter the cavity 56 via a lower set of the vent holes 80*a*, can rise within the cavity 56 along the various gaps 68 (see FIG. 3), receiving heat from the battery 78 via convective heat transfer, then exit the cavity 56 through the an upper set of the vent holes 80*b* (or the top of the case 64, if open). Likewise, air along the bottom of the cavity 56 can flow along the various gaps 72 between the bottom spacer pads 54 (see FIG. 3), then upwards along the various gaps 68 and out of any number of the vent holes 80 (or the top of the case 64, if open).

It will be understood that forced convection can be similarly facilitated by the gaps 68 and 72 and the vent holes 80. For example, various of the vent holes 80 (e.g., the lower set of vent holes 80*a* illustrated in FIG. 5) can be aligned with an air-moving system of the relevant vehicle, such that cooler air can be forced into and through the cavity 56 (e.g., via the various gaps 68 and 72) in order to cool the battery by forced convection.

The number, size, and spacing of the vent holes 80 (or others) can be selected from any variety of combinations, in order to provide appropriate fluid flow paths between the inside and outside of the case 64. As illustrated in FIGS. 3 through 6, for example, the vent holes 80 are configured as rectangular holes approximately 3 inches long and 1 inch tall. In other embodiments, however, other sizes are possible. In some embodiments, it may be useful to at least partly align the vent holes 80 with at least some of the internal gaps 68 or 72. In this way, for example, the vent holes 80 can operate in combination with customizable internal heat transfer features (e.g., gaps between spacers) in order to provide appropriate heat transfer for a given set of operating conditions.

In some embodiments, plugs can be used to selectively block fluid flow through various openings in a CWS case. FIGS. 3 through 6, for example, illustrate the use of two removable plugs 82 to prevent air flow through a pair of the vent holes 80. In other arrangements, a different number of the plugs 82 can be used. Likewise, one or more of the plugs 82 can be disposed in different instances of the vent holes 80.

Figure 7:
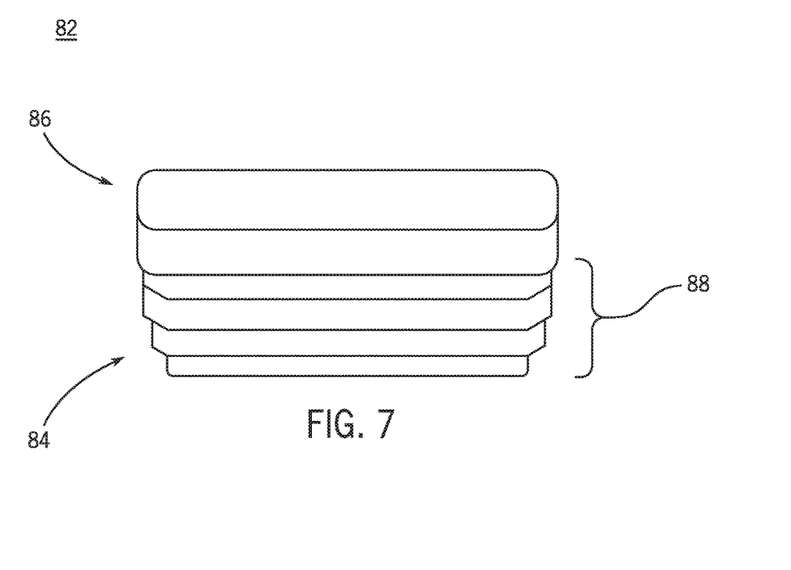
FIG. 7 is a top perspective view of an example configuration for the ventilation plugs.

Plugs for a CWS can be configured in various ways. For example, as illustrated in FIG. 7 in particular, the plugs 82 include an inner end 84 with a perimeter that is somewhat smaller than a perimeter at an outer end 86. In this way, for example, the plugs 82 can be easily oriented for insertion into the vent holes 80 (see, e.g., FIG. 6), and can be manually inserted until a press (or other) fit between the plugs 82 and the walls of the vent holes 80 (or other features of the case 64) hold the plugs 82 in place. The plugs 82 also include a stepped geometry 88, or other corrugated geometry, can also be useful in this regard. In some embodiments, clasps, hooks, or other features (not shown) can be used to secure the plugs 82 in place once inserted into the various vent holes 80. In some embodiments, the vent holes 80 and the plugs 82 (or at least a subset thereof) can be configured with relatively similar (or even identical) geometry, such that any one of the plugs 82 can be inserted into any one of the vent holes 80.

Figure 8:
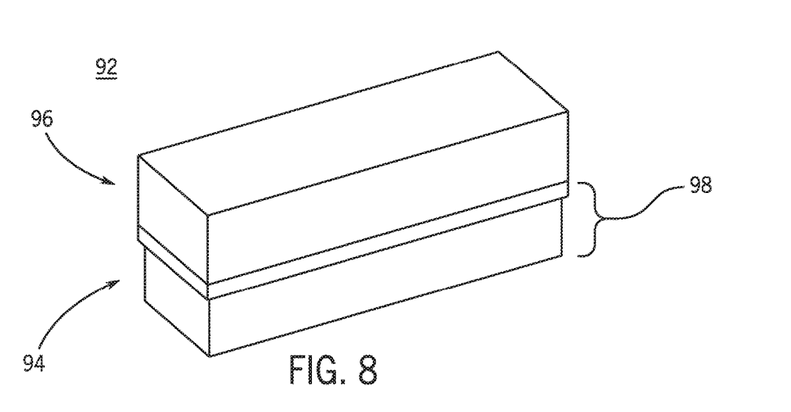
FIG. 8 is a top perspective of another example configuration for the ventilation plugs.

Another example configuration for plugs for a CWS is illustrated in FIG. 8 as a plug 92. Similarly to the plugs 82, the plug 92 includes an inner end 94 with a perimeter that is somewhat smaller than a perimeter at an outer end 96. In this way, for example, the plug 92 can be easily oriented for insertion into the vent holes 80 (see, e.g., FIG. 6), and can be manually inserted until a press (or other) fit between the plugs 92 and the walls of the relevant vent hole 80 (or other features of the case 64) hold the plug 92 in place. In contrast to the plugs 82, the plug 92 does not include an extended stepped or corrugated geometry over area 98 of the plug 92.

In some applications, insertion of the plugs 82 (or the plugs 92, and so on) into the vent holes 80 can entirely block flow through the vent holes 80. This can be useful, for example, for operation of the relevant vehicle in a relatively cold environment (e.g., a freezer), where infiltration of colder air into the case 64 may be undesirable. In such a case, for example, with the vent holes 80 fully blocked by the plugs 82, air trapped within the case 64, including air within the side gaps 68 and the bottom gaps 72 can act as insulation to significantly slow the cooling of the battery. In other applications, it may be useful to only partially block air flow through the vent holes 80, in order to regulate, but not fully prevent, movement of hot or cold air into and out of the vent holes 80.

In this regard, again, use of the plugs 82 can help to provide further customizability for the CWS 50. For example, a user can provide for any variety of heat transfer configurations by arranging the spacer pads 52 and 54 to define convection channels (or insulating spaces) that compliment not only the locations of the vent holes 80, but also the customized arrangement of the plugs 82, to partially or fully block a customized set of the vent holes 80.

As also noted above, covers such as the blanket 40 (see FIGS. 1 and 2) can also be useful with regard to heat transfer. For example, for colder environments, such a cover can obstruct air infiltration via the top of the cavity 56, while also trapping a layer of air above the battery, thereby further insulating the battery from the colder surroundings.

In some embodiments, additional holes can be provided in a CWS. For example, referring again to FIGS. 1 and 4, holes 100 and 102 can be provided extending from the cavities 34 and 56, through the support plates 24 and 66, respectively, to the outside of the cases 32 and 64. The holes 100 and 102, for example, can allow for drainage of fluid (e.g., water) away from a battery within the cases 32 and 64. In some embodiments, plugs (not shown) similar to the plugs 82 or 92, or otherwise configured, can also be provided for the holes 100 and 102 (or other similar holes).

In some embodiments, height-adjustment members can also be configured with heat-transfer or drainage holes. For example, as illustrated in FIG. 1, the height-adjustment plates 28 and 30 includes holes 100*a* and 100*b* that are generally similar to and aligned with the holes 100. In other embodiments, other arrangements are possible. For example, drainage holes through a height-adjustment member may not necessarily be similar to or align with a drainage hole through a corresponding support plate.

In some embodiments, the spacer pads 54 and the gaps 72 (or other spacers and gaps) can be arranged within the cavity 56 (or another cavity) in order to efficiently route fluid towards the holes 102 (or others). In some embodiments, the inner, bottom surface of the cavity 56 (or other surfaces) can be otherwise contoured in order to produce a similar routing effect.

In some embodiments, spacers (e.g., relatively small metal plates or pads similar to the spacer pads 54) can be disposed between a support member for a CWS and one or more height-adjustment members. For example, where multiple height-adjustment plates (not shown) are provided between the support plate 66 and the cavity 56 for the CWS 50, various spacers (not shown) can be arranged between the support plate 66 and the height-adjustment plates, in order to space the support plate 66 from the height-adjustment plates, or in order to space the height-adjustment plates from each other. In some embodiments, such spacing of the various support and height-adjustment plates from each other can not only provide an appropriate depth for the cavity 56, but can also further protect a battery within the cavity 56 from contacts or vibrations, and can provide further insulation between the battery and the exterior of the case 64.

In some embodiments, a cavity of a CWS case (e.g., the case 32 or 64) can be sized to accommodate components other than a battery. For example, a CWS case can be sized to accommodate another energy source (e.g., a hybrid energy source) along with a battery, such that the relevant vehicle can draw power from either the battery or the other energy source. Where no such energy source (or other additional component) is to be included in a case, the flexibility provided by the various spacer pads, adjustable brackets, and so on, can ensure that a battery received within the case is appropriately held in place, even if the relevant cavity is somewhat larger than the battery. This flexibility may also be useful as current battery technology (e.g., LI batteries) is enhanced or replaced with power sources having even higher power densities.

The various features discussed herein, alone or in various combinations, can provide a number of benefits over conventional systems. One benefit, for example, may be enhanced protection of the battery from contact. Similarly, the various air gaps provided by the included spacers (as well as the spacers themselves) can permit the walls of a CWS case to flex or bend a relatively large distance without directly impacting a battery therein.

As a further example, and as also discussed above, the disclosed CWS can help to protect a battery from excessive heat in an operating environment. In some embodiments, including for the CWS 50, removing the plugs 82 from the vent holes 80 can allow for relatively substantial heat transfer via natural (or forced) convection, such that the battery may be able to operate for extended periods without overheating. For example, assuming internal resistance for a battery of approximately 4 milli-ohms and average operating current of 50 amps, operation of the battery may generate approximately 10 watts of heating power. Assuming a relatively warm temperature of 20 degrees C., with a typical battery size and only natural convection, the surface temperature of the battery within the CWS 50 may remain at only slightly above ambient temperature (e.g., at 20.25 degrees C., which is well below a typical operating limit of 55 degrees C. With forced convection (e.g., due to a fan or to movement of the vehicle) the cooling of the battery could be even more efficient.

As yet another example, and as also discussed above, the disclosed CWS can help to protect a battery from excessive cold in an operating environment. For example, for the CWS 50, with each vent hole 80 blocked by a plug 82, with appropriate thickness and spacing of the various spacer pads 52 and 54, and with an insulating cover (e.g., an insulating blanket) in place, a battery may be sufficiently protected from even extreme cold (e.g., −40 degrees C.), so that the battery may be able to power vehicle operations for a full 8 hour shift (or longer) without the need for replacement. For example, even where the walls 58 and 60 of the case 64 quickly reach a relatively cold ambient temperature, assuming the battery characteristics noted above (i.e., 4 milli-ohm resistance, with 50 amp current), a battery may remain at an appropriate operating temperature for an entire operating shift (or longer).

As still another example, the disclosed CWS can be combined with a particular battery and shipped to work facilities as a single unit. This can provide significant inventory and handling savings, as well as increasing the ease of installation of new battery systems for different vehicles.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A counterweight system for a battery of a material handling vehicle, the counterweight system comprising:
    a counterweight case configured to receive the battery;
    a plurality of spacers disposed within the counterweight case;
    the spacers spacing the battery apart from one or more internal walls of the counterweight case, when the battery is received in the counterweight case; and
    the spacers being configured to be customizably arranged into different configurations within the counterweight case.

2. The counterweight system of claim 1, further comprising:
    one or more gaps at least partly defined by the spacers, wherein the one or more gaps are configured to allow fluid to flow along the one or more gaps;
    wherein a configuration of the one or more gaps is customizably changeable by customizably arranging the spacers.

3. The counterweight system of claim 2, wherein the spacers and the one or more gaps are at least partly disposed along one or more internal surfaces of one or more side walls of the counterweight case.

4. The counterweight system of claim 2, wherein the one or more gaps are configured to allow fluid to flow along one or more fluid paths that are adjacent to the battery, such that fluid flowing along the one or more fluid paths causes convective heat transfer between the fluid and the battery.

5. The counterweight system of claim 1, wherein at least one of the spacers is configured as a spacer pad configured to be removably attached to an inner wall of the counterweight case.

6. The counterweight system of claim 1, wherein one or more side walls of the counterweight case include a plurality of vent holes configured to allow fluid to pass into and out of the counterweight case.

7. The counterweight system of claim 6, further comprising:
    a plurality of plugs configured for insertion into the vent holes;
    wherein each of the plugs is configured to block passage of fluid into and out of the counterweight case when inserted into a corresponding one of the vent holes.

8. The counterweight system of claim 7, wherein each of the plugs is configured for insertion into each of the vent holes, the plugs thereby being configured to provide a customizably changeable fluid-flow configuration via insertion of one or more of the plugs into a customizably selectable set of one or more of the vent holes.

9. The counterweight system of claim 8, wherein each of the plugs includes a stepped or corrugated geometry extending at least partly between inner and outer ends of the plug.

10. The counterweight system of claim 1, wherein a base portion of the counterweight system includes:
    a base support; and
    one or more height-adjustment members configured to be disposed above the base support to support the battery at a customizable height.

11. The counterweight system of claim 10, wherein the base portion includes a plurality of the height-adjustment members stacked vertically to shorten a depth of a cavity for the battery.

12. The counterweight system of claim 10, further comprising:

one or more base-portion spacers disposed between the base support and at least one of the one or more height-adjustment members;

wherein the one or more base-portion spacers space the at least one height-adjustment member apart from base support.

13. The counterweight system of claim 12, further comprising:

one or more base-portion gaps at least partly defined by the base-portion spacers, wherein the one or more base-portion gaps are configured to allow fluid to flow at least partly along the one or more base-portion gaps.

14. The counterweight system of claim 10, wherein the base portion of the counterweight system includes one or more base-portion holes configured to allow fluid to pass into and out of the counterweight case.

15. The counterweight system of claim 14, wherein the each of the one or more height-adjustment members includes one or more holes configured to align with the one or more base-portion holes when the one or more height-adjustment members are supported by the base support within the counterweight case.

16. The counterweight system of claim 1, further comprising:

a flexible cover configured to at least partly enclose the counterweight case;

wherein the flexible cover is configured to at least partly trap a gas layer above a top surface of the battery, such that the gas layer thermally insulates the battery.

17. The counterweight system of claim 16, wherein the flexible cover includes a substantially transparent area to allow viewing of the inside of the counterweight case.

18. A customizable battery system for a material handling vehicle, the customizable battery system comprising:

a counterweight case that includes a base support and a plurality of side walls, the base support and side walls at least partly defining a cavity for receiving a battery;

a plurality of first spacer pads disposed within the cavity, at least partly along the plurality of side walls, to space the battery apart from one or more of the side walls, with one or more first gaps between the first spacer pads allowing fluid to flow along the side walls for convective heat transfer with the sides of the battery;

a plurality of second spacer pads disposed within the cavity, at least partly above the base support, to space the battery apart from the base support, with one or more second gaps between the second spacer pads allowing fluid to flow along the one or more second gaps for convective heat transfer with the bottom of the battery; and a plurality of height adjustment members, each configured to be supported by at least one of: the base support of the counterweight case, another height adjustment member, and at least one of the second spacer pads;

the first spacer pads and the second spacer pads being configured to be customizably arranged into different configurations within the counterweight case, to one or more of: support the battery in a customizable orientation and provide customizable heat transfer effects for the one or more first gaps and the one or more second gaps; and the height adjustment members being configured to be customizably included or excluded from the counterweight case to one or more of: support the battery in the customizable orientation and provide the customizable battery system with a customizable weight.

19. The customizable battery system of claim 18, further comprising:

a plurality of vent holes through one or more of the side walls, the vent holes being configured to allow fluid to pass into and out of the counterweight case to flow along the one or more first gaps and the one of more second gaps; and a plurality of plugs configured for insertion into the vent holes to at least partly block flow of fluid through the vent holes;

each of the plugs being configured for insertion into each of the vent holes, the plugs being thereby configured to provide a customizably changeable fluid-flow configuration via insertion of one or more of the plugs into a customizably selectable set of one or more of the vent holes.

20. A method of customizing a battery system for a material handling vehicle, with the battery system including a counterweight case that includes a base support and side walls for receiving a battery, first spacer pads, second spacer pads disposed within the counterweight case at least partly above the base support, and a plurality of height adjustment members, the method comprising:

selecting a number of the height adjustment members for installation within the counterweight case, to provide a support surface for the battery at a select height within the counterweight case;

selecting a number of the first spacer pads for installation along the side walls of the counterweight case, to space the battery at a select spacing from the side walls, with a first select configuration of fluid-flow gaps between the first spacer pads;

selecting a number of the second spacer pads for installation above the base support and the selected height adjustment members, to space the battery at a select distance above the support surface, with a second select configuration of fluid-flow gaps between the second spacer pads;

installing the selected height adjustment members, the selected first spacer pads, and the selected second spacer pads within the counterweight case; and installing the battery within the counterweight case to be supported by the selected height adjustment members, the selected first spacer pads, and the selected second spacer pads.

* * * * *